Patented Jan. 5, 1943

2,307,704

UNITED STATES PATENT OFFICE 2,307,704

BENZAL OCTYL CYANOACETATE AS A PEST-CONTROL AGENT

William Moore, Stamford, Conn., assignor to American Cyanamid Company, New York, N. Y., a corporation of Maine No Drawing. Application April 10, 1941, Serial No. 387,871

1 Claim. (Cl. 167—30)

The present invention relates to a pest-control agent and more particularly to a compound which is especially effective as a contact poison for the control of insects and allied pests.

The invention is based upon the discovery that benzal octyl cyanoacetate possesses strong insecticidal activity against soft-bodied insects which are particularly difficult to exterminate, for example the citrus red spider, *Tetranychus citri*, and that such activity is attained without any substantial harmful or deleterious action on the vegetation infested with the insect.

The following example illustrates a specific method of preparing the above compound in accordance with the invention. Materials employed are in parts by weight.

Example 20 parts of benzaldehyde were gradually added to 40 parts of octyl cyanoacetate cooled at 0° C. 2 parts of piperidine (catalyst) were added and the mixture was then allowed to stand for 12 hours in a closed vessel at approximately 5° C. Considerable water had separated at the end of this period. The mixture was allowed to stand at room temperature (20° C.) for an additional 12 hours. The oily reaction product was dissolved in ether, washed neutral (0.05% $H_2SO_4$), dried over sodium sulfate and distilled at reduced pressure. The benzal octyl cyanoacetate was recovered as a colorless oil distilling at 150° C. at 1 mm. It solidified on cooling to room temperature.

Spray solutions were prepared by dissolving the benzal octyl cyanoacetate in a solvent medium consisting of 65% acetone and 35% water. A 100% control was obtained when a spray of 1–1000 dilution was used against the citrus red spider, *Tetranychus citri*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert solid diluents as kieselguhr, wood flour, walnut shell, talc, and the like.

While the invention has been described with particular reference to specific embodiments, it is to be understood that it is not to be limited thereto but is to be construed broadly and restricted solely by the scope of the appended claim.

I claim:

An insecticide containing as an active ingredient benzal octyl cyanoacetate.

WILLIAM MOORE.